United States Patent [19]
Jezek

[11] Patent Number: 5,419,365
[45] Date of Patent: May 30, 1995

[54] PRESSURE REGULATOR FOR WATER BLASTING

[75] Inventor: Paul D. Jezek, Houston, Tex.

[73] Assignee: J. Edward Stachowiak, Houston, Tex.

[21] Appl. No.: 168,933

[22] Filed: Dec. 16, 1993

[51] Int. Cl.⁶ ............................................. F16K 17/04
[52] U.S. Cl. .................................. 137/454.6; 137/509; 137/115
[58] Field of Search ................... 137/509, 513.3, 454.6, 137/115

[56] References Cited

U.S. PATENT DOCUMENTS

| | | | |
|---|---|---|---|
| 2,578,795 | 12/1951 | Gardiner et al. | 137/509 |
| 3,406,912 | 10/1968 | Claffey | 137/509 X |
| 4,192,346 | 3/1980 | Iizumi | 137/509 X |
| 4,401,264 | 8/1983 | Williams et al. | 137/509 X |
| 4,653,527 | 3/1987 | Kosarzecki | 137/509 X |
| 4,901,978 | 2/1990 | Feild | 137/509 X |

Primary Examiner—Stephen M. Hepperle
Attorney, Agent, or Firm—Bush, Moseley, Riddle & Jackson

[57] ABSTRACT

A regulator for a high pressure water blast system includes a body which houses a replaceable valve cartridge that includes a tubular seat member and an axially slidable valve element. The valve element is biased toward closed position by an adjusting knob that houses a spring-loaded plunger which engages the valve element. The seat member is hydraulically biased against a stop shoulder and the valve element is hydraulically biased toward the adjusting knob. The design of bias areas and spring rates is such that the adjusting knob can be easily operated by hand. The seat member and valve element provide a replaceable cartridge assembly so that all wear parts can be replaced, when needed, in the field.

14 Claims, 1 Drawing Sheet

PRESSURE REGULATOR FOR WATER BLASTING

FIELD OF THE INVENTION

This invention relates generally to a water blast system where a high pressure stream of water is used to remove unwanted deposits from a surface, and particularly to a new and improved water blast system pressure regulator having wear resistant parts included in a replaceable cartridge, and which can be easily adjusted by hand even under very high operating pressures.

BACKGROUND OF THE INVENTION

In high pressure water blast cleaning, one type of spray gun that is used is a shut-off style which automatically closes when there is no force on an operating lever that controls a valve in the gun. When the valve closes, water is re-routed at high pressure from the blast gun to a regulator valve at the pump. The regulator valve reduces the pressure to near atmospheric, and the water is fed to the supply tank or other remote location. A major drawback of the system is that high pressure remains in the line between the blast gun and the regulator at all times while the pump is running, even though the blast gun control valve is closed. This can create a dangerous situation in the event of hose failure, or where the operator is unaware that high pressure is present at the blast gun.

Where a regulator valve is employed, the pump is running continuously at a constant speed regardless of whether the gun operator is blasting or not, and supplies a constant line pressure that is independent of flow. Most regulators include a hardened valve element such as a ball that cooperates with a seat in a manner such that the valve is pressed against the seat with a very high force which offsets the force due to line pressure acting on the exposed area of the valve element. The regulating force typically is produced by a large, heavy coil spring or a stack of Belville washers which require a wrench for adjustment. Although straightforward in design, another major drawback is that water is jetted constantly across the seat and valve at operating pressure while the pump is running, even though blasting operations have been suspended. This causes excessive regulator and valve element wear, as well as wear on other parts that are exposed to a high velocity stream of water downstream of the valve. Such parts can require considerable time and expense to replace, particularly in the field. Another problem with such regulators is that as noted above they cannot be adjusted by hand due to the large hydraulic force applied to the valve which is offset by equally large spring forces. As an example, the hydraulic force can be in the range of from 4,000 to 6,000 lbs. at an operating pressure of 15,000 psi.

Although efforts have been made to use nitrogen gas in a large pressure cylinder to supply the high reactor force needed on the regulator valve, the system requires an additional hand adjustable regulator at the cylinder to maintain a constant pressure. Thus, the system is very large, heavy and expensive because at the physical size of the nitrogen bottle, and becomes nonfunctional when the nitrogen supply is exhausted.

An object of the present invention is to provide a new and improved pressure regulator for a water blast system that obviates the above-mentioned short-comings.

Another object of the present invention is to provide a new and improved pressure regulator of the type described which can be easily adjusted by hand so that no tools or wrenches are required.

Yet another object of the present invention is to provide a new and improved regulator of the type described where all wear parts are housed and contained in an easily replaceable cartridge.

Still another object of the present invention is to provide a new and improved regulator that has compact size and is light-weight to permit easy installation at any point in a water blast system.

Another object of the present invention is to provide a new and improved pressure regulator for a water blast system where the valve cartridge includes a bleed-down orifice to purge the blast line after the pump has been shut down.

SUMMARY OF THE INVENTION

These and other objects are attained in accordance with the present invention through the provision of a pressure regulator valve apparatus for water blasting operations that includes a generally tubular body having a hand operated adjustment knob threadedly received in one end thereof. An internal bore in the body receives a removable valve cartridge assembly having a diffuser on its outer end, and one or more high pressure ports are formed in the body. The adjustment knob houses a spring-loaded plunger that is arranged such that as the knob is turned clockwise, the plunger engages the cartridge valve element and applies increasing force tending to hold it in its closed position. The cartridge also includes a tubular seat member that is sealed within the bore of the body and shaped such that its outer or leading end has an outer diameter that is slightly larger than the outer diameter of the trailing or inner end thereof. The bore of the seat member slidably receives the valve element and defines a seat surface which is engageable with a closure surface on the valve element. The valve element has a leading end portion with a diameter that is larger than that diameter of closure contact with the seat surface on the seat member. Radial ports through the wall of the seat member connect the high pressure inlets with the high pressure outlet when the valve element is shifted axially away from the seat and against the bias of the adjusting spring.

Inlet pressure causes the seat member to be biased against a body shoulder so as to maintain a fixed position, and the valve element to be biased away from the seat. As pressure increases, the hydraulic force on the valve dement eventually will over-balance the adjusting spring force and cause the valve element to open so that a portion of water volume can bypass through the diffuser. The various hydraulic areas are designed so that under full operating pressure the adjusting knob can be readily operated by hand. As the valve element opens, system pressure will begin to drop, and at a certain valve position equilibrium is achieved so that a constant pressure is maintained. High pressure fluid enters the diffuser at high velocity and passes through radial holes into an outlet line at low pressure and velocity. As pressure increases or decreases for any reason, the valve element moves axially relative to its seat to maintain a constant system pressure. A small fixed-size orifice in the replaceable cartridge allows high pressure to bleed off once the pump is stopped. The valve assembly or cartridge can be easily replaced by removing an adapter fitting and sliding the cartridge out of the bore of the body. Such cartridge includes all parts that may be worn by high velocity flow. Thus the regulator can be repaired in the field in a simple and reliable manner.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which.

DETAILED DESCRIPTION OF PREFERRED EMBODIMENT

Figure 1:
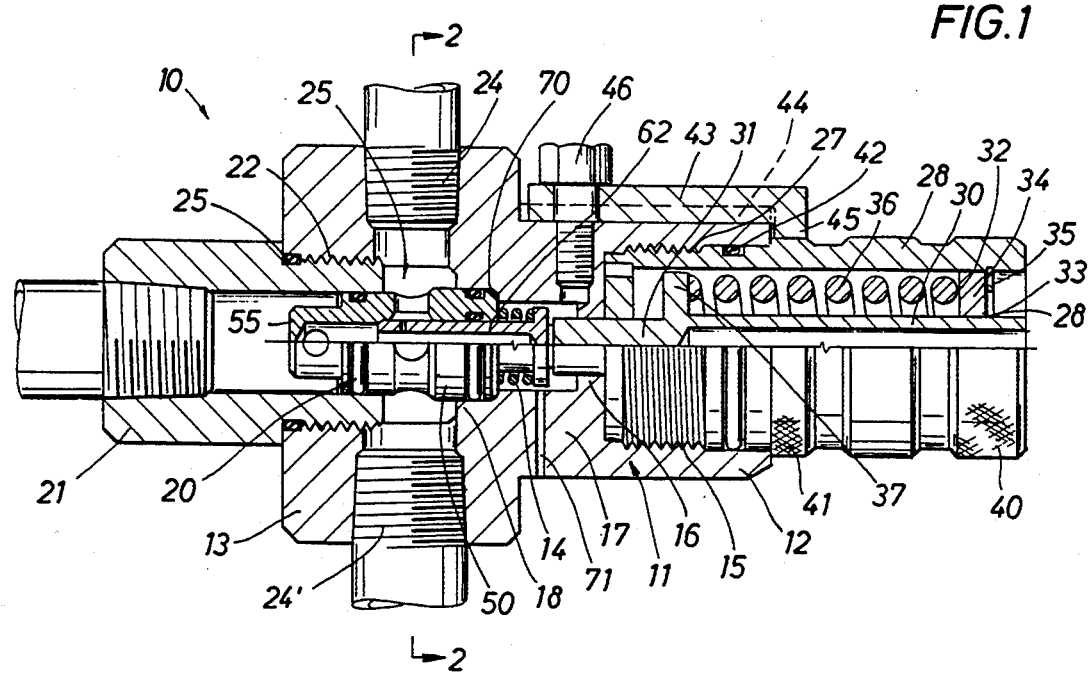
FIG. 1 is a cross-sectional view of the pressure regulator of the present invention, with some parts in side elevation.

Referring initially to FIG. 1, a pressure regulator apparatus which functions to maintain a constant system pressure in a water blasting operation is indicated at 10. The regulator 10 includes a generally tubular body 11 having a reduced diameter section 12, an enlarged diameter section 13, and an internal bore 14. The bore 14 has an outer threaded portion 15, a reduced diameter guide portion 16, a bleed portion 17, and an outer portion 18 which receives a replaceable valve cartridge assembly 20. The outer end of the cartridge 20 is supported by the bore of an adaptor fitting 21 that is threaded into the body 11 at 22. A seal ring 25 prevents leakage. One or more high pressure ports 24 lead to an annular chamber 25 that surrounds the cartridge assembly 20, one of such ports being connected to the pump. Another of the ports 24' can be connected to a water blast gun, or plugged if not needed. Also, the pressure regulator 10 can be mounted on the discharge manifold of a pump, and the blast gun connected directly to the discharge outlet of the manifold.

Threads 27 on the body section 12 receive the threaded end of an adjusting knob 28. The knob 28 houses a plunger 30 whose inner end 31 slides through the guide portion 16 and whose outer end 32 slides through the center opening 33 in a stop disc 34 that is retained by a snap ring 35. A spring 36, which can be either a cylindrical helical spring or a stack of Bellville washers reacts between an outwardly directed flange 37 on the plunger 30 and the inner face 38 of the disc 34. The knob 28 preferably has knurled surfaces 40, 41 to aid in turning the same by hand. A wiper ring 42 prevents water or debris from reaching the threads 27 from the outside. In order to rotationally lock the knob 28 in any selected portion, a key 43 which is positioned in a longitudinal slot 44 has an outer end portion 45 that forcefully engages the knurled surface 41 when tightened down by a cap screw 46.

Figure 4:
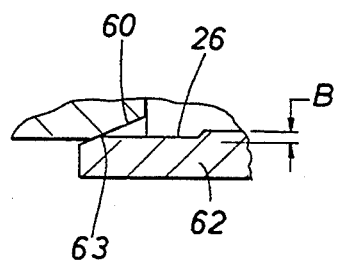
FIG. 4 is an enlarged fragmentary cross-sectional view showing the valve element engaging the seat.
Figure 3:
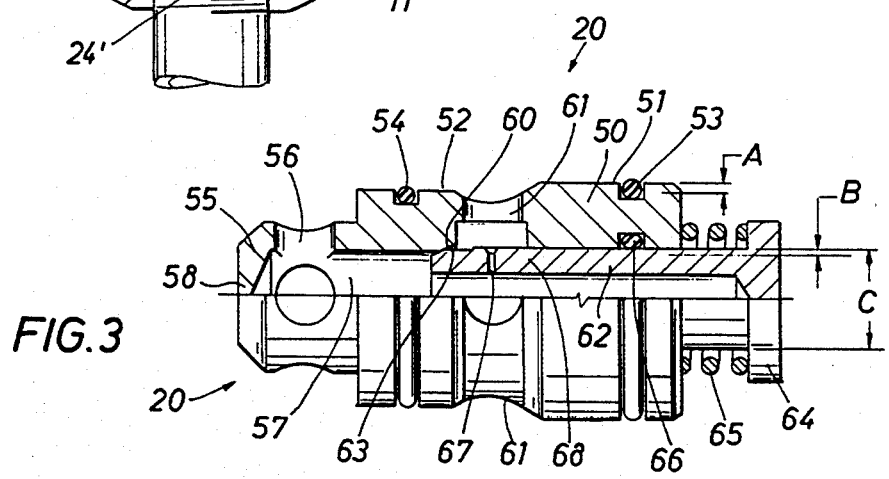
FIG. 3 is an enlarged view of the replaceable valve cartridge assembly, one side being shown in section and the other in elevation.

As shown in more detail in FIG. 3, the replaceable valve cartridge assembly 20 includes a tubular seat member 50 which has an enlarged diameter outer surface 51 and a reduced diameter outer surface 52. Seals 53, 54 are mounted in grooves in the respective surfaces. The outer end portion 55 of the seat member 50 provides a diffuser having ports 56 that lead from the inner bore 57 to the outside. The outer end on the portion 55 is closed by a wall 58. A conical seat surface 60 is formed in the bore 57, and a plurality of radial flow ports 61 communicate with the chamber 25 through the reduced diameter surface 52. A valve element 62 is slidably arranged in the seat member 50 and has a conical outer end surface 63 which can be moved toward and away from the seat surface 60 to control water flow through the port 61. In a preferred form, the angle of the conical surface 63 is slightly less than the angle of the conical seat surface 60, as shown in FIG. 4, so that when the valve element 62 is closed, a metal-to-metal engagement is defined at the diameter of the inner edge of the conical seat 60. As shown in FIG. 3, the outer end of the valve element 62 is provided with an outwardly directed flange 64, and a small coil spring 65 reacts between the flange and the end of the seat member 50 to hold the valve element in engagement with the inner end of the plunger 30. A seal 66 prevents leakage between the valve element 62 and the seat member 50, and a small bleed orifice 67 is provided either in the inner end section 68 on the valve member or through the wall of the seat section 52 for purposes to be described below.

OPERATION

Figure 2:
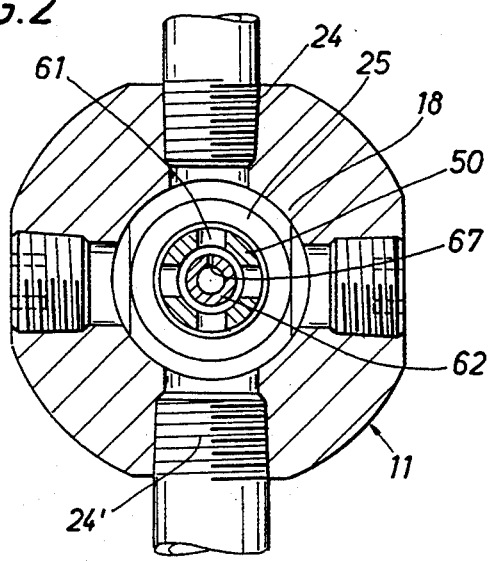
FIG. 2 is a cross-section on line 2—2 of FIG. 1.

In operation, the regulator 10 is assembled as shown in the drawings and may be connected in the high pressure line between the pump and the blast gun. For example, the regulator can be mounted directly on the pump manifold by using a nipple having one end threaded into one of the high pressure ports 24, and the other end threaded into the pump outlet port. If desired, a pressure gauge (not shown) can be threaded into another one of the ports 24, and any unused ports plugged off as shown in FIG. 2. The high pressure line going to the blast gun may be connected to the port 24' in the body 11. A low pressure return line is connected to an adapter which is screwed into the fitting 21 on the body 11, and provides a return of water from the diffuser 55 to the pump supply tank or remote drain. Such fitting can be fluted or the like since lower pressure water is being conveyed.

When the pump is turned on so that water under high pressure is supplied to the regulator 10, the water enters the annular chamber 25 and flows outward toward the blast gun via the port 24'. The high pressure acts outward on the differential area A of the seat element 56 (FIG. 3) to cause the seat member to engage the stop shoulder 70 in the body 11 and be held firmly against same. Such pressure also acts outward on the differential area B of the valve element 62 to produce a hydraulic force which is opposed by the force of the spring 36. When the hydraulic force overbalances such bias force, the valve element 62 will move away from the seat surface 60 and allow water to flow via the ports 61 to the ports 56 in the diffuser 55. Once the valve element 62 is opened, hydraulic pressure acts over the differential transverse area $\underline{B}$ thereof, which is the area defined by the difference between the diameter C and the reduced diameter 26 of the seat surface 63. The parts of the cartridge 20 are dimensional so that the area A is larger than the area B, which allows the seat member 50 to always be biased toward the shoulder 70 and occupy the same axial position relative to the adjustable knob 28 under pressure, which permits accurate regulation of pressure. In an exemplary embodiment, the hydraulic areas are designed so that under full operating pressure no more than about 300 lbs. of axial force on the valve element 62 is required for operation, which permits hand adjustment under pressure by turning the knob 28.

The spring 36 is preloaded by turning the knob 28 to provide a desired opposing force that must be overbalanced before the valve element can move outward to an open position. A vent port 71 is provided on the body 11 to ensure that the full pressure differential is developed across the areas A and B and to relieve pressure in case of seal failure. When the valve element 62 moves away from the seat surface 60, regulated high pressure water flows around the valve element and out the high pressure port 24' via the radial ports 61 and the chamber 25. High pressure water also passes into the diffuser chamber 57 where the pressure is substantially reduced, and into the return line via the ports 56 and the fitting 21. When a desired operating pressure is established by adjustment of the knob 28, the locking key 43 is activated by tightening the capscrew 46.

As the system pressure increases or decreases, for example, due to varying flow requirements, the valve element 62 will move out or in so that the differential area B times the pressure is equal to the reaction force of the spring 36. Such movement varies the size of the flow area past the end of the valve element 62 to maintain a constant system pressure. When the adjustment knob 28 is turned clockwise to cause axial inward movement thereof, the force of the spring 36 which acts in the plunger 30 and the valve element 62 is increased, requiting a higher pump pressure to open the valve element. Thus the regulated pressure is increased. Of course turning the knob 28 in the counterclockwise direction reduces the regulated pressure.

The small orifice 67 bleeds off a high pressure when the pump is shut down. Once the pump is stopped, the valve element 62 will close, and would otherwise trap high pressure in the line. This feature prevents such trapping from occurring, so that a potentially dangerous situation does not exist at the blast gun. Under normal operating conditions the cartridge seat member 50 and valve element 62 can become worn due to the jetting action of high velocity liquids on various surfaces thereof. Where significant wear has occurred, the cartridge assembly 20 can be easily and quickly replaced in the field by removing the low pressure fitting 21, removing the worn cartridge assembly, and replacing it with a new one. Any bypass of liquid due to wear goes out through the diffuser ports 56 and back to the supply tank or other remote location. The vent port 71 also provides a telltale of any leakages past the seals 53 or 66 since leaked fluids will pass through this port to the outside of the body 11.

It now will be recognized that a new and improved regulator for use in water blast operations has been disclosed. All wear items on the regulator are in a single replaceable cartridge, and the regulator can be adjusted by hand even under high pressure. The bleed orifice in the cartridge assembly prevents the trapping of potentially dangerous high pressure when the pump is stopped. Since certain changes or modifications may be made in the disclosed embodiments without departing from the inventive concepts involved, it is the aim of the appended claims to cover all such changes and modifications falling within the true spirit and scope of the present invention.

What is claimed is:

1. A pressure regulator for use in a high pressure water blast system, comprising: a body having an internal chamber and high pressure connection means in communication with said chamber; replaceable regulator valve means in said chamber including a tubular seat member having an internal seat surface and a tubular valve element movable within said seat member and relative to said seat surface to control flow through said regulator valve means, said valve element having a closed bore and a transverse differential area on which pressure acts to produce a force tending to increase the flow area between said seat surface and valve element; said body including a stop shoulder for said seat member, said seat member having a transverse differential area on which said pressure acts to hold said seat member against said stop shoulder and manually adjustable means including a resilient element for applying force to said valve element tending to decrease said flow area.

2. The regulator of claim 1 wherein said differential area of said seat member is greater than said differential area of said valve element.

3. The regulator of claim 1 wherein said seat member includes a diffuser section having at least one flow port leading from said chamber to the outside of said body to diffuse flow downstream of said seat surface.

4. The regulator of claim 1 wherein said seat surface is conical, said valve element having a closure surface that engages said seat member surface to control flow through said regulator valve means.

5. The regulator of claim 4 wherein said closure surface is conical and the angle of said conical seat surface of said seat member is greater than the angle of said conical surface of said valve element to provide substantially circumferential line engagement between said member and element in said closed position.

6. A replaceable valve cartridge assembly for use in a high pressure water blast system having a body with a stop shoulder, comprising: a tubular seat member having at least one radial port and an internal seat surface, and a tubular valve element slidably arranged in said seat member and having a closure surface movable relative to said seat surface to regulate flow through said port, said seat member having a transverse differential area on which fluid pressure acts to hold said seat member against the stop shoulder, said valve element having a closed bore and a differential transverse area so that said fluid pressure applies hydraulic opening force to said valve element.

7. The assembly of claim 6 wherein said tubular seat member has a larger outer diameter portion on one side of said port and a smaller diameter outer portion on the other side of said port so that fluid pressure applies hydraulic force to said seat member in one axial direction.

8. The assembly of claim 6 wherein said valve element has a larger diameter sealing portion and a smaller diameter seat portion which define said differential transverse area so that hydraulic pressure produces force on said valve member.

9. The assembly of claim 6 wherein said valve cartridge assembly further includes high pressure bleed port means for bleeding high pressure in the absence of flow through said assembly.

10. The valve cartridge assembly of claim 6 wherein said seat surface is conical, said closure surface engaging said seat surface with substantially circumferential line contact.

11. The valve cartridge assembly of claim 10 wherein said closure surface is conical and the angle of said conical seat surface is greater than the angle of said conical closure surface.

12. The valve cartridge assembly of claim 6 further including diffuser means on one end of said seat member, said diffuser means having at least one flow port in communication with the bore of said seat member.

13. The valve cartridge assembly of claim 6 further including resilient means for biasing said valve element in said one axial direction.

14. The valve cartridge assembly of claim 6 further including port means for bleeding off pressure when said valve element is closed.

* * * * *